United States Patent
Margalit et al.

(10) Patent No.: US 9,232,563 B2
(45) Date of Patent: Jan. 5, 2016

(54) AGGREGATION OF BANDWIDTH FROM MULTIPLE WIRELESS DEVICES

(71) Applicant: EMPIRE TECHNOLOGY DEVELOPMENT, LLC, Wilmington, DE (US)

(72) Inventors: Mordehai Margalit, Zichron Yaaqov (IL); Menachem Kaplan, Tel Aviv (IL); Vlad Grigore Dabija, Mountain View, CA (US); Maya Goodman, Tel Aviv (IL); Noa Ramot, Jaffa (IL); Dana Cohen, Jaffa (IL); Noam Meir, Herzlia (IL)

(73) Assignee: Empire Technologies Development LLC, Wilmington, DE (US)

( * ) Notice: Subject to any disclaimer, the term of this patent is extended or adjusted under 35 U.S.C. 154(b) by 56 days.

(21) Appl. No.: 14/118,649

(22) PCT Filed: Aug. 13, 2013

(86) PCT No.: PCT/US2013/054644
§ 371 (c)(1),
(2) Date: Nov. 19, 2013

(87) PCT Pub. No.: WO2015/023257
PCT Pub. Date: Feb. 19, 2015

(65) Prior Publication Data
US 2015/0050898 A1    Feb. 19, 2015

(51) Int. Cl.
*H04B 7/15* (2006.01)
*H04W 88/06* (2009.01)
(Continued)

(52) U.S. Cl.
CPC ............... *H04W 88/06* (2013.01); *H04L 5/00* (2013.01); *H04W 76/025* (2013.01); *H04W 88/04* (2013.01)

(58) Field of Classification Search
USPC .............. 455/7, 11.1, 15, 16, 17, 20; 370/315
See application file for complete search history.

(56) References Cited

U.S. PATENT DOCUMENTS

| | | |
|---|---|---|
| 6,223,222 B1 | 4/2001 | Fijolek et al. |
| 7,047,309 B2 | 5/2006 | Baumann et al. |

(Continued)

FOREIGN PATENT DOCUMENTS

CN    102497660    6/2012

OTHER PUBLICATIONS

Sreng, V. et al., "Relayer Selection Strategies in Cellular Networks with Peer-to-Peer Relaying", Vehicular Technology Conference, 2003. VTC 2003-Fall. 2003 IEEE 58th (vol. 3) , 5 pages.

(Continued)

*Primary Examiner* — Nguyen Vo
(74) *Attorney, Agent, or Firm* — Moritt Hock & Hamroff LLP; Steven S. Rubin, Esq.

(57) ABSTRACT

Technologies are generally described for an aggregation of bandwidth from multiple wireless devices. In some examples, a source device may communicate with a destination device at a first bandwidth. The source device may divide data into a first piece and a second piece. The source device may transmit the first piece to a first wireless device and the second piece to a second wireless device over a first network. The first wireless device and second wireless device may communicate with the destination device at a second bandwidth and a third bandwidth respectively. The first bandwidth may be less than an aggregation of the second bandwidth and the third bandwidth. The first wireless device may transmit the first piece over a second network, different from the first network, to the destination device. The second wireless device may transmit the second piece over a third network, different from the first network, to the destination device.

20 Claims, 8 Drawing Sheets

(51) Int. Cl.
*H04L 5/00* (2006.01)
*H04W 76/02* (2009.01)
*H04W 88/04* (2009.01)

(56) References Cited

U.S. PATENT DOCUMENTS 8,014,415 B2 9/2011 Alapuranen
2009/0316763 A1* 12/2009 Erkip et al. .................. 375/211

OTHER PUBLICATIONS

Pabst, R. et al., Relay-Based Deployment Concepts for Wireless and Mobile Broadband Radio, Wireless World Research Forum, Sep. 2004, 80-89.

Connectify Dispatch Technology Overview, retrieved from www.connectify.me/dispatch-technology-overview/ on Jan. 29, 2013, 4 pages.

International Search Report and Written Opinion for application with application No. PCT/US13/54644, dated Oct. 4, 2013, 14 pages.

* cited by examiner

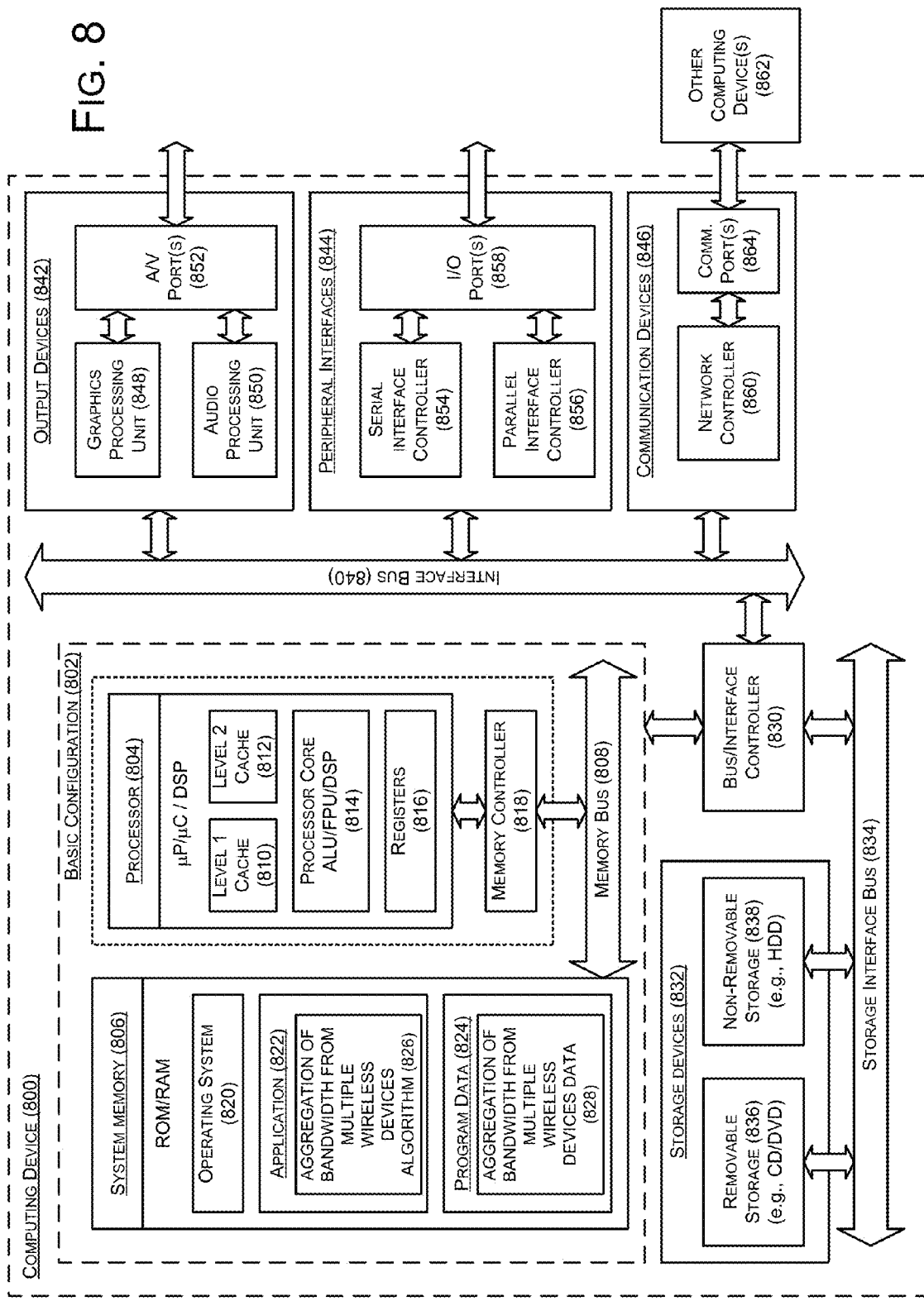

AGGREGATION OF BANDWIDTH FROM MULTIPLE WIRELESS DEVICES

CROSS REFERENCE TO RELATED APPLICATIONS

This application is a U.S. National Stage filing under 35 U.S.C. §371 of International Application No. PCT/US13/54644 filed on Aug. 13, 2013, the entirety of which is hereby incorporated by reference.

BACKGROUND

Unless otherwise indicated herein, the materials described in this section are not prior art to the claims in this application and are not admitted to be prior art by inclusion in this section.

Wireless devices are commonly used in telecommunications. Such devices permit services that may be impractical or impossible with the use of wires. Wireless devices use some form of energy (e.g., electromagnetic waves) to transfer information without the use of wires, and may transfer information over both short and long distances.

SUMMARY

According to some examples, methods for transmitting data from a source device to a destination device are generally described. The source device may be configured to communicate with the destination device at a first bandwidth. The method may include the source device dividing the data into at least a first piece and a second piece. The methods may include transmitting the first piece from the source device over a first network to a first wireless device. The first wireless device may be configured to communicate with the destination device at a second bandwidth. The methods may further include transmitting the second piece from the source device over the first network to a second wireless device. The second wireless device may be configured to communicate with the destination device at a third bandwidth. The first bandwidth may be less than an aggregation of the second bandwidth and the third bandwidth. The methods may include transmitting the first piece from the first wireless device over a second network, different from the first network, to the destination device. The methods may further include transmitting the second piece from the second wireless device over a third network, different from the first network, to the destination device.

According to other examples, systems effective to transmit data from a source device to a destination device are generally described. The source device may be effective to communicate with the destination device at a first bandwidth. The systems may include a first wireless device, a second wireless device, and a source device. The source device may be configured to be in communication with the first and second wireless device over a first network. The source device may be configured to divide the data into at least a first piece and a second piece. The source device may transmit the first piece over the first network to the first wireless device. The first wireless device may be configured to communicate with the destination device at a second bandwidth. The source device may transmit the second piece over the first network to the second wireless device. The second wireless device may be configured to communicate with the destination device at a third bandwidth. The first bandwidth may be less than an aggregation of the second bandwidth and the third bandwidth. The first wireless device may be configured to receive the first piece. The first wireless device may be configured to transmit the first piece over a second network to the destination device. The second network may be different from the first network. The second wireless device may be configured to receive the second piece. The second wireless device may be configured to transmit the second piece over a third network to the destination device. The third network may be different from the first network.

According to further examples, methods for transmitting data from a source device to a destination device are generally described. The source device may be configured to communicate with the destination device at a first bandwidth. The methods may include the source device dividing the data into at least a first piece and a second piece. The methods may include the source device transmitting the first piece over a first network to a first wireless device. The first wireless device may be configured to communicate with the source device at a second bandwidth. The methods may further include the source device transmitting the second piece over a second network to a second wireless device. The second wireless device may be configured to communicate with the source device at a third bandwidth. The first bandwidth may be less than an aggregation of the second bandwidth and the third bandwidth. The methods may further include the first wireless device transmitting the first piece over a third network to the destination device. The third network may be different from the first network. The methods may further include the second wireless device transmitting the second piece over the third network to the destination device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 8 is a block diagram illustrating an example computing device that is arranged to implement aggregation of bandwidth from multiple wireless devices;

Figure 1:
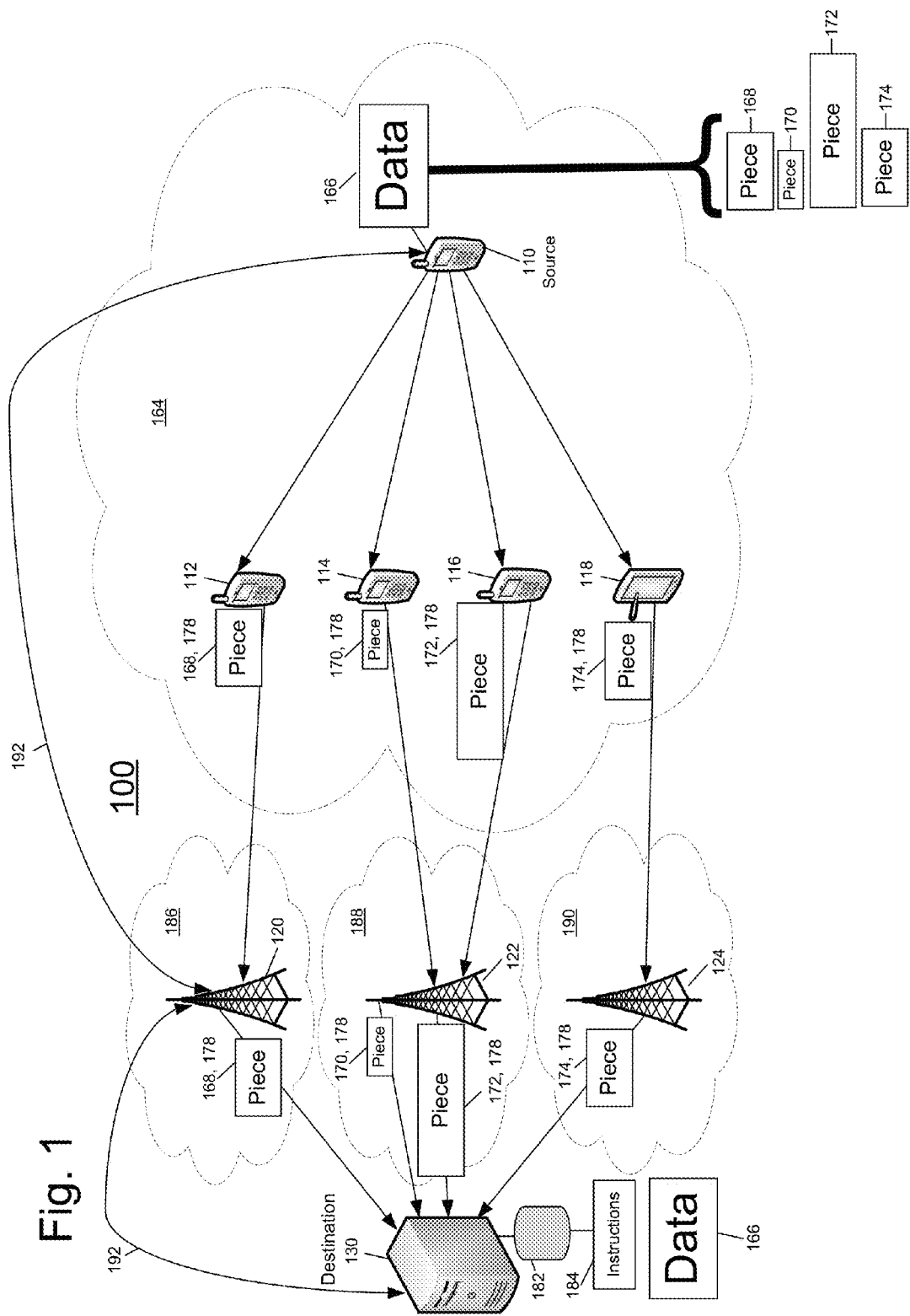
FIG. 1 illustrates an example system that can be utilized to implement aggregation of bandwidth from multiple wireless devices.

all arranged in accordance with at least some embodiments presented herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to technologies including methods, apparatus, systems, devices, and computer program products related to aggregation of bandwidth from multiple wireless devices.

Briefly stated, technologies are generally described for an aggregation of bandwidth from multiple wireless devices. A source device may communicate with a destination device at a first bandwidth. The source device may divide data into a first piece and a second piece. The source device may transmit the first piece to a first wireless device and the second piece to a second wireless device over a first network. The first wireless device and second wireless device may communicate with the destination device at a second bandwidth and a third bandwidth respectively. The first bandwidth may be less than an aggregation of the second bandwidth and the third bandwidth. The first wireless device may transmit the first piece over a second network, different from the first network, to the destination device. The second wireless device may transmit the second piece over a third network, different from the first network, to the destination device.

FIG. 1 illustrates some example systems that can be utilized to implement aggregation of bandwidth from multiple wireless devices, arranged in accordance with at least some embodiments presented herein. As depicted, a system 100 may include a source device 110, wireless devices 112, 114, 116, and 118, network base stations 120, 122, and 124, a destination device 130, and a network 164. Network 164 may be, for example, a WI-FI network operating in accordance with IEEE (Institute of Electrical and Electronics Engineering) standard 802.11x. Destination device 130 may be in communication with a memory 182 including instructions 184.

As described in more detail below, source device 110 may capture source data 166. Source data 166 may be images, audio, presentations, video of moving visual images of an event or any other data file. A user of source device 110 may want to broadcast source data 166 to destination device 130. Source device 110 may not have sufficient bandwidth capacity to transmit source data 166—such as may be the case when source device 110 has limited bandwidth or a poor connection, or where data is high definition video. Source device 110 may divide source data 166 into two or more pieces 168, 170, 172, 174. Pieces 168, 170, 172, 174 may, for example, correspond to one or more data packets. Source device 110 may transmit pieces 168, 170, 172, 174 to wireless devices 112, 114, 116, and 118. By dividing source data 166 into pieces, and transmitting the pieces to two or more wireless devices, source device 110 may transmit source data 166, for example, the high definition video to destination device 130. Source device 110 may maintain a relatively low bandwidth communication path 192 with destination device 130 throughout transmission of source data 166.

Wireless devices 112, 114, 116, and 118 may be cell phones, tablet devices, wearable devices such as GOOGLE GLASS, or any other wireless device. Wireless devices 112, 114, 116, and 118 may serve as relays for source device 110 by being effective to communicate on two wireless networks. Wireless devices 112, 114, 116, and 118 may be subscribers of a mobile or cellular service of various operators. Wireless devices 112, 114, 116, and 118 may communicate with respective cellular communications networks and may communicate with source device 110 through network 164. Wireless device 112 may communicate on a network 186 such as a cellular network. Wireless devices 114 and 116 may both communicate on a different network 188 and wireless device 118 may communicate on another network 190.

Wireless devices 112, 114, 116, and 118 may have different bandwidth capacities. Source device 110 may divide source data 166 into pieces 168, 170, 172, and 174 corresponding to the varying bandwidth capacities. Pieces 168, 170, 172, and 174 may be of equal or different amounts of data. A processor 150 may assign synchronization data 178 to each piece 168, 170, 172, and 174 such that source data 166 may be reconstructed at destination device 130 as discussed in more detail below. Source device 110 may send information relating to synchronization data 178 over communication path 192 to destination device 130.

Pieces 168, 170, 172 and 174, with synchronization data 178, may be transmitted by source device 110 over network 164 to wireless devices 112, 114, 116, and 118, respectively. Wireless devices 112, 114, 116, and 118 may receive pieces 168, 170, 172, and 174, with synchronization data 178, respectively. In response to receiving pieces 168, 170, 172, and 174, with synchronization data 178, wireless devices 112, 114, 116, and 118 may transmit each respective piece to destination device 130. By dividing source data 166 into pieces 168, 170, 172 and 174, and transmitting the pieces to multiple wireless devices, source device 110 may aggregate bandwidth from multiple wireless devices.

Each wireless device 112, 114, 116, and 118 may transmit respective pieces 168, 170, 172, and 174 with synchronization data 178 over a respective service network. Each service network may include different base stations. For example, base stations 120, 122, and 124 may be on different networks 186, 188, and 190, respectively. Base stations 120, 122, and 124 may transmit pieces 168, 170, 172 and 174 with synchronization data 178 to destination device 130 through networks 186, 188, and 190.

Destination device 130 may receive pieces 168, 170, 172 and 174 with synchronization data 178. Destination device 130 may, such as by executing instructions 184, reconstruct source data 166. Destination device 130 may broadcast source data 166 to a network or other devices. For example, a weather report may be transmitted to a news studio and the news studio may broadcast the weather report over the news network. Destination device 130 also may store source data 166 in memory 182 for future use.

Figure 2:
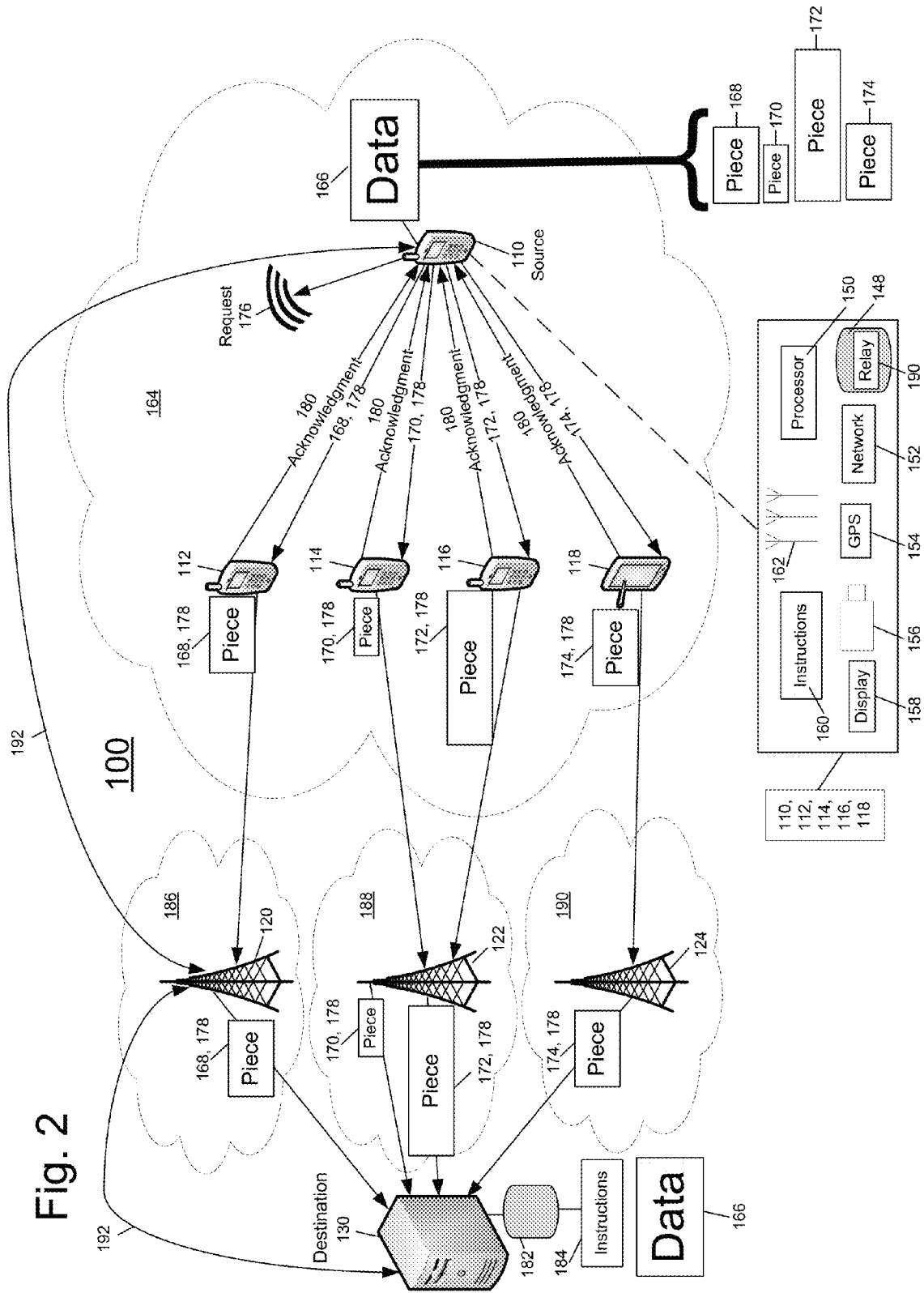
FIG. 2 illustrates the example system of FIG. 1 depicting further details regarding communication between a source device and wireless devices.

FIG. 2 illustrates the example system of FIG. 1 depicting further details regarding communication between a source device and wireless devices, arranged in accordance with at least some embodiments presented herein. System 100 of FIG. 2 is substantially similar to system 100 of FIG. 1, with additional details. Those components in FIG. 2 that are labeled identically to components of FIG. 1 will not be described again for the purposes of clarity.

Source device 110 and wireless devices 112, 114, 116 and 118 may have similar components. Focusing on source device 110 as being illustrative, source device 110 may include a memory 148, a processor 150, a network module 152, a global positioning system ("GPS") module 154, a camera 156, a display 158, instructions 160, a relay application 190 and an array of antennas 162.

In an example, a user of source device 110 may want to broadcast video data from an event. The event may be news related, sports related, entertainment related, or any other event where video is wanted. Source device 110 may not have bandwidth capacity to transmit the video data.

Source device 110 may broadcast a request 176 for bandwidth. Request 176 may be sent via network 164, which may be WI-FI, to wireless devices within network 164. Wireless devices within WI-FI network 164 that have relay application 190 installed in memory 148 may receive bandwidth request 176 from source device 110. Wireless devices within network 164 that do not have relay application 190 installed may not receive request 176. Wireless devices 112, 114, 116, and 118 with relay application 190 may receive request 176 and, in response, send an acknowledgement 180 to source device 110.

Relay application 190 may include an acknowledgement designation to be set by the user of the wireless device with relay application 190. In an example, the acknowledgement may be designated as permanent consent where the wireless device is set to always send acknowledgement 180 indicating consent to act as a relay when a request 176 is broadcast. Acknowledgement 180 may also be designated as a one time acknowledgement per event. In an example, a user of a wireless device may be notified of request 176 by ringing, vibrating, or a pop up window.

The user of the wireless device may then decide whether to transmit acknowledgement 180. A denial of request 176 may not be necessary as the source device may communicate with wireless devices that send acknowledgement 180. In a one time acknowledgement per event scenario, events may pertain to different amounts of data to transfer and transferring may occur over different amounts of time. For example, an event may relate to transmitting a video of a home run. In this example, the event would comprise video lasting a duration of approximately sixty seconds. In another example, an event may relate to video of a report from a location of an emergency situation where the duration will be over a few hours or even an indefinite amount of time.

Users of a wireless device that sent acknowledgement 180 may also end communication with source device 110 and no longer transmit source data 166 by simply moving out of network 164. Relay application 190 may also optionally end or decrease communication with source device 110 if the respective wireless device receives another communication such as a phone call, text message, or email.

Incentives may be offered for users of wireless devices in exchange for sending acknowledgement 180. Incentives may be modeled for providing acknowledgment 180 in exchange for a service, cash compensation, free access to content, or any other criteria. For example, a free movie rental may be offered in exchange for providing acknowledgement 180 to transmit a movie for another user.

Acknowledgment 180 may be sent from wireless devices 112, 114, 116, and 118 to source device 110. Acknowledgement 180 may include an indication of bandwidth capacity from each respective wireless device 112, 114, 116, and 118 along with consent to act as a relay for source device 110. Processor 150 in source device 110 may receive acknowledgment 180 through antenna array 162.

In an example, a cell phone user may be at a news event. Relay application 190 may be installed on the cell phone. An alert on the cell phone may indicate to the cell phone user that a request for bandwidth 176 has been received by the cell phone. The cell phone user has the option to acknowledge request 176 and consent to have the cell phone act as a relay or to ignore request 176. The cell phone user may send acknowledgement 180 acknowledging request 176 and consenting to having the cell phone act as a relay for any time when cell phone user was not using cell phone—in exchange for an incentive. The cell phone user may stop acting as a relay at any time that the cell phone user would want to use the cell phone. Relay application 190 may also stop the cell phone from acting as a relay or limit relay bandwidth when another cellular network communication is received by the cell phone so that the cell phone user will receive communications even after consenting to have cell phone act as a relay. The cell phone may continue to act as a relay after the other cellular network communication has ended.

In an example, multiple wireless devices 112, 114, 116, and 118 may have provided acknowledgement 180 and may be acting as relays for source device 110. The total bandwidth capacity available to source device 110 would be the aggregate of the bandwidth of wireless devices 112, 114, 116, and 118. If any of the wireless devices 112, 114, 116, or 118 were to leave network 164, such as by physically leaving, or ceasing to transmit source data 166, source device 110 may not have bandwidth capacity to broadcast source data 166. Source device 110 may continually broadcast request 176 to continually request bandwidth capacity to compensate for changing amounts of available bandwidth capacity.

Figure 3:
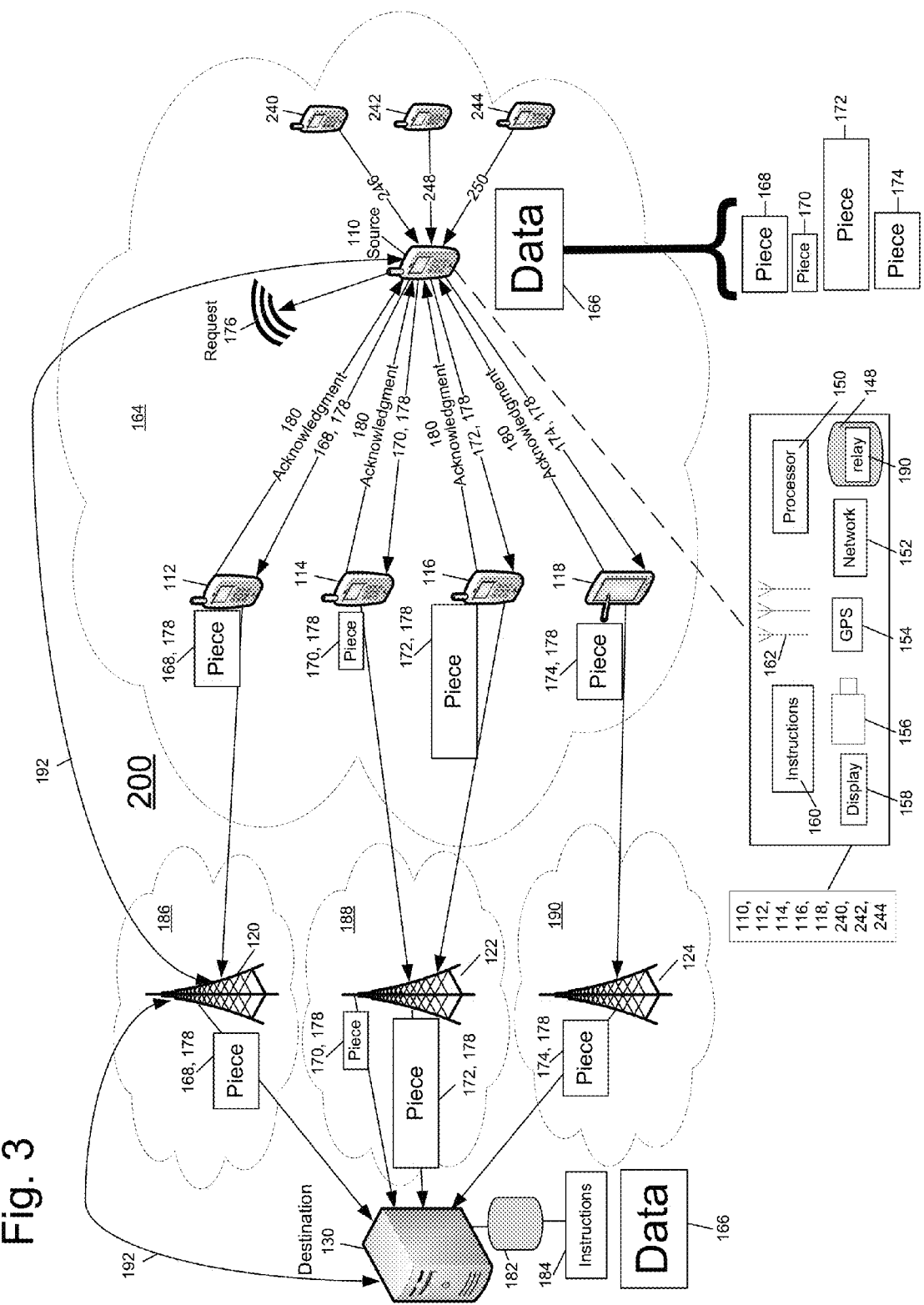
FIG. 3 illustrates the example system of FIG. 2 depicting further details relating to additional input devices.

FIG. 3 illustrates the example system of FIG. 2 depicting further details relating to additional input devices, arranged in accordance with at least some embodiments presented herein. As depicted, a system 200 of FIG. 3 is substantially similar to system 100 of FIG. 1 and FIG. 2, with additional details. Those components in FIG. 3 that are labeled identically to components of FIG. 1 and FIG. 2 will not be described again for the purposes of clarity.

System 200 may further include input devices 240, 242, and 244. Input devices 240, 242, and 244 may be cell phones, tablet devices, wearable devices such as GOOGLE GLASS, or any other wired or wireless device. Input devices 240, 242, and 244 may communicate with source device 110 through network 164. Input devices 240, 242, 244 may transmit respective input data 246, 248, 250 to source device 110. Source device 110, may generate source data 166 in response to receiving input data 246, 248, and 250. Source data 166 may comprise a collection of input data 246, 248 and 250. For example, input data 246, 248, and 250 may be video data from three different cameras at different locations at an event. In another example, input data 246, 248, and 250 may be from three different microphones at a concert.

Figure 4:
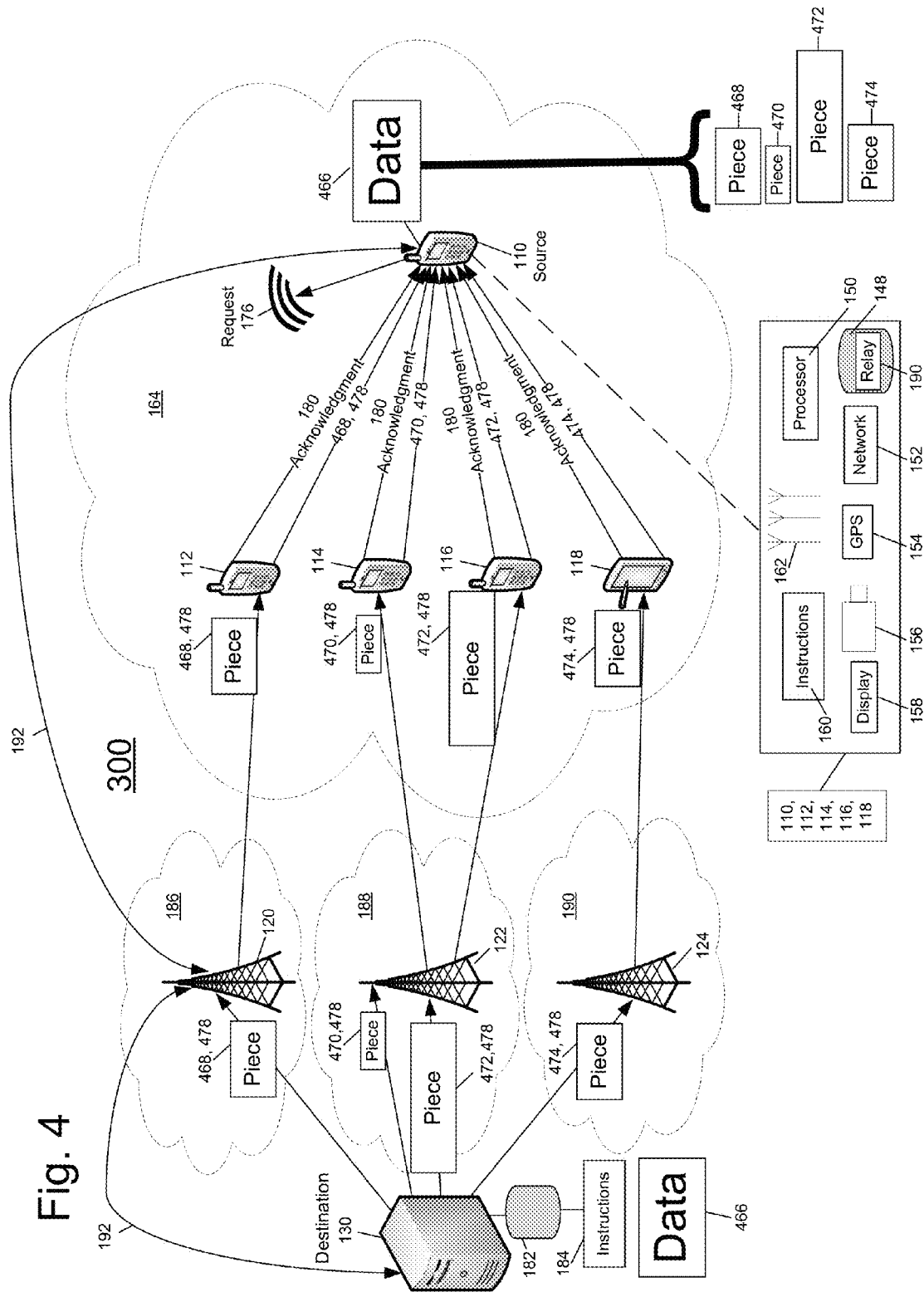
FIG. 4 illustrates an example system that can be utilized to implement aggregation of bandwidth from multiple wireless devices.

FIG. 4 illustrates an example system 300 that can be utilized to implement aggregation of bandwidth from multiple wireless devices, arranged in accordance with at least some embodiments described here. System 300 of FIG. 4 is substantially similar to system 100 of FIG. 1 and FIG. 2, with additional details. Those components in FIG. 4 that are labeled identically to components of FIG. 1 and FIG. 2 will not be described again for the purposes of clarity.

As mentioned above, after source device 110 has established communication with wireless devices 112, 114, 116, and 118, source device may transmit data to destination device 130 by aggregating available bandwidth from wireless devices 112, 114, 116, and 118. Source device 110 may also receive data 466 from destination device 130 again by aggregating bandwidth available from wireless devices 112, 114, 116, and 118.

In an example, a user of source device 110 may want to receive data 466 at destination device 130 requiring a bandwidth capacity exceeding the capacity of source device 110. Data 466 could be for example, high definition video of a movie. Source device 110 may communicate over communication path 192 with destination device 130. Source device 110 may broadcast request 176 for bandwidth over network 164. Wireless devices 112, 114, 116, and 118 with relay application 190 may receive request 176 and, in response, send acknowledgement 180 to source device 110 along with bandwidth capacities. Source device 110 may send information, such as the identity of bandwidth capacities, pertaining to wireless devices 112, 114, 116, and 118 to destination device 130.

Destination device 130 may divide data 466 into pieces 468, 470, 472, and 474 corresponding to the varying bandwidth capacities of wireless devices 112, 114, 116, and 118. Destination device 130 may assign synchronization data 478 to each piece 468, 470, 472, and 474 such that data 466 may be reconstructed at source device 110. Pieces 468, 470, 472 and 474, with synchronization data 478, may be transmitted by destination device 130 over networks 186, 188 and 190 to wireless devices 112, 114, 116, and 118 respectively.

Wireless devices 112, 114, 116, and 118 may receive pieces 468, 470, 472, and 474, with synchronization data 478 respectively. In response to receiving pieces 468, 470, 472, and 474, with synchronization data 478, wireless devices 112, 114, 116, and 118 may transmit each respective piece to source device 110 over network 164. Source device 110 may receive pieces 468, 470, 472 and 474 with synchronization data 478. Source device 110 may, such as by executing instructions 160, reconstruct data 466.

Figure 5:
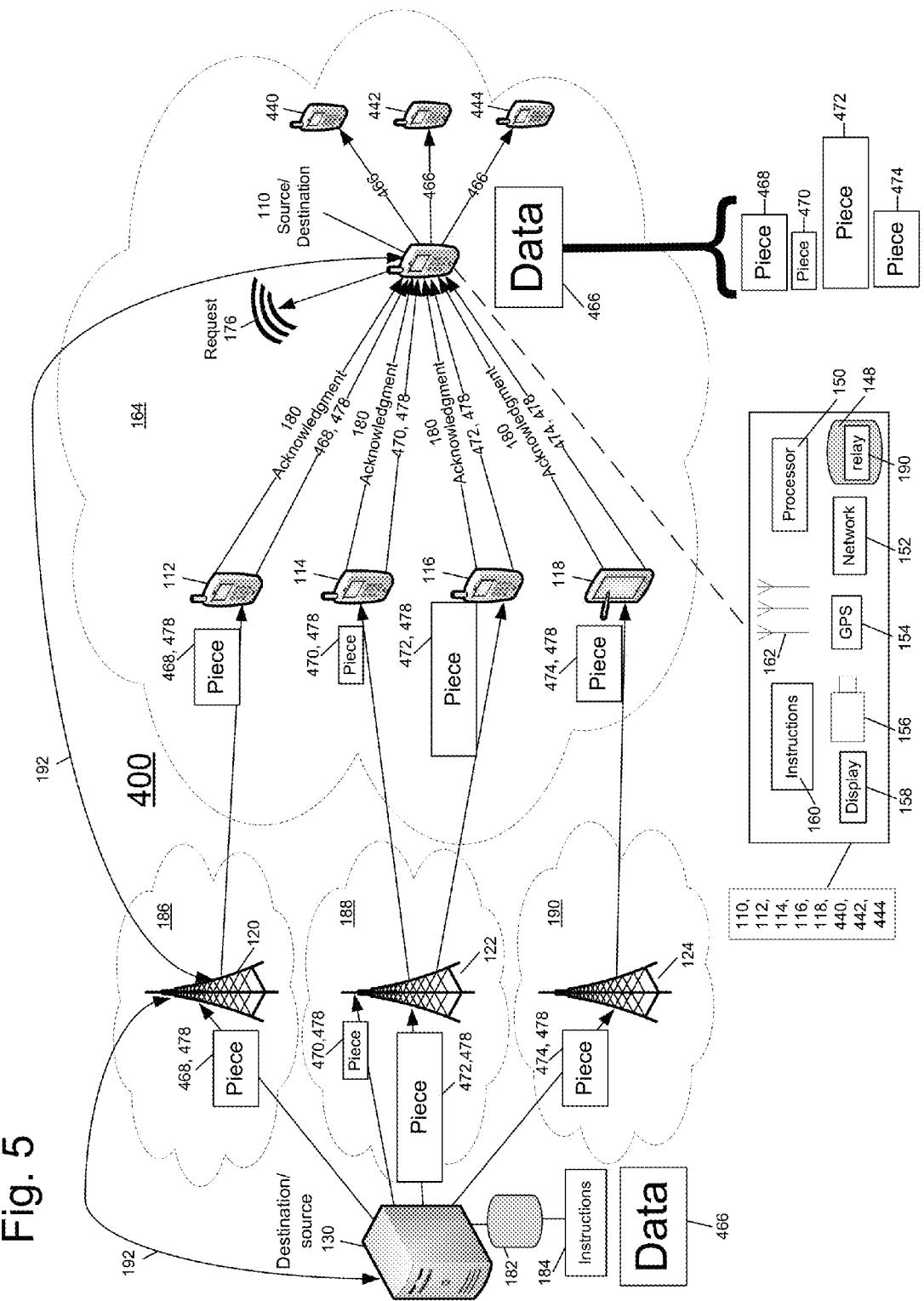
FIG. 5 illustrates the example system of FIG. 4 depicting further details relating to additional output devices.

FIG. 5 illustrates the example system of FIG. 4 depicting further details relating to additional output devices, arranged in accordance with at least some embodiments presented herein. As depicted, a system 400 of FIG. 5 is substantially similar to system 300 of FIG. 4 with additional details. Those components in FIG. 5 that are labeled identically to components of FIG. 4 will not be described again for the purposes of clarity.

System 400 may further include devices 440, 442, and 444. As described above, source device 110 may receive data 466 from destination device 130 by aggregating bandwidth from multiple wireless devices 112, 114, 116, and 118. Source device may further transmit data 466 to devices 440, 442, and 444 over network 164. Devices 440, 442, and 444 may each receive data 466 from source device 110. Source device 110 may also send data 466 to any device within network 164. Wireless devices 112, 114, 116, and 118 may each receive data 466 transmitted by source device 110 over network 164.

Among other possible benefits, a system in accordance with the present disclosure may be used to transmit large quantities of data from a location with limited wireless network availability. Aggregating the bandwidth of multiple wireless devices may allow news crews to effectively crowd source bandwidth in order to broadcast from an event, preventing the need for costly satellite equipment. Mobile device users may be able to stream movies and other video that would otherwise be too large to stream without aggregating the bandwidth from multiple wireless devices.

Figure 6:
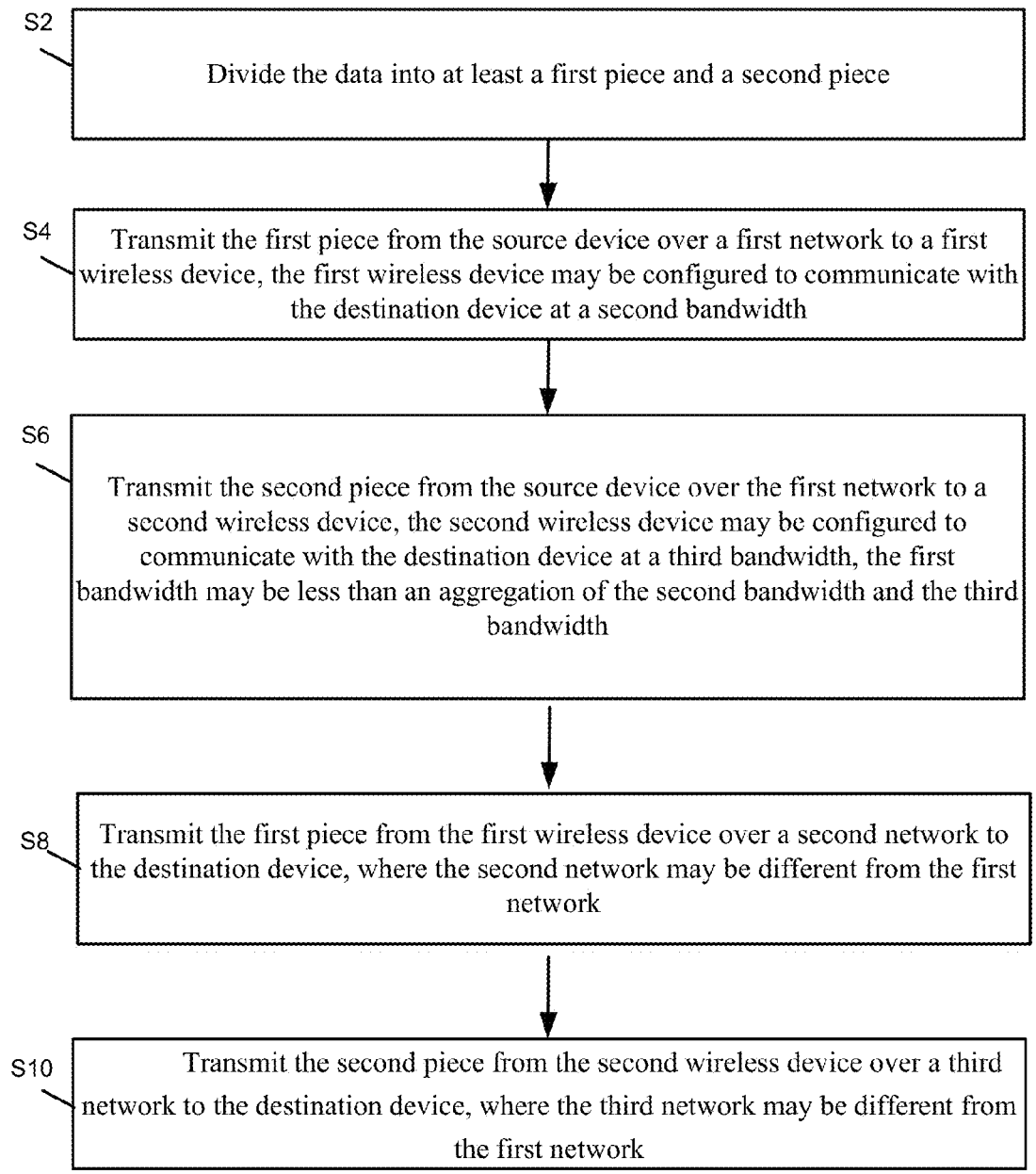
FIG. 6 illustrates a flow diagram illustrating an example process for implementing aggregation of bandwidth from multiple wireless devices.

FIG. 6 illustrates a flow diagram illustrating an example process for implementing aggregation of bandwidth from multiple wireless devices, arranged in accordance with at least some embodiments presented herein. The process in FIG. 6 could be implemented using, for example, systems 100, 200, 300 or 400 discussed above and may be used for transmitting data from a source device to a destination device. The source device may be configured to communicate with the destination device at a first bandwidth.

An example process may include one or more operations, actions, or functions as illustrated by one or more of blocks S2, S4, S6, S8 and/or S10. Although illustrated as discrete blocks, various blocks may be divided into additional blocks, combined into fewer blocks, or eliminated, depending on the desired implementation.

Processing may begin at block S2 "Divide the data into at least a first piece and a second piece." At block S2, a source device may not have sufficient bandwidth capacity to transmit data such as a high definition video. The source device may divide the data into at least a first piece and a second piece. The source device may receive the data from two or more input devices. Before transmission, the source device may send requests for bandwidth over the first network and receive acknowledgements in response. The acknowledgements may include indications of bandwidth capacity. The source device may divide the data into the first and the second piece based on the bandwidth capacities.

Processing may continue from block S2 to block S4 "Transmit the first piece from the source device over a first network to a first wireless device, the first wireless device may be configured to communicate with the destination device at a second bandwidth." At block S4, the source device may transmit the first piece over a first network to a first wireless device. The first network may be a WIFI network. The first wireless device may be a cell phone, tablet device, wearable device such as GOOGLE GLASS, or any other wireless device. The source device may assign synchronization data to the first and the second piece to facilitate reconstruction of the data.

Processing may continue from block S4 to block S6 "Transmit the second piece from the source device over the first network to a second wireless device, the second wireless device may be configured to communicate with the destination device at a third bandwidth, the first bandwidth may be less than an aggregation of the second bandwidth and the third bandwidth." The second wireless device may be a cell phone, tablet device, wearable device such as GOOGLE GLASS, or any other wireless device.

Processing may continue from block S6 to block S8 "Transmit the first piece from the first wireless device over a second network to the destination device, where the second network may be different from the first network." At block S8, the first wireless device may transmit the first piece over a second network to the destination device. The first wireless device may be a subscriber of a cellular service and the second network may be the cellular service.

Processing may continue from block S8 to block S10 "Transmit the second piece from the second wireless device over a third network to the destination device, where the third network may be different from the first network." At block S10, the second wireless device may transmit the second piece over a third network to the destination device. The second wireless device may be a subscriber of cellular service and the third network may be the cellular service. The second network may be the same as, or different from, the third network.

Figure 7:
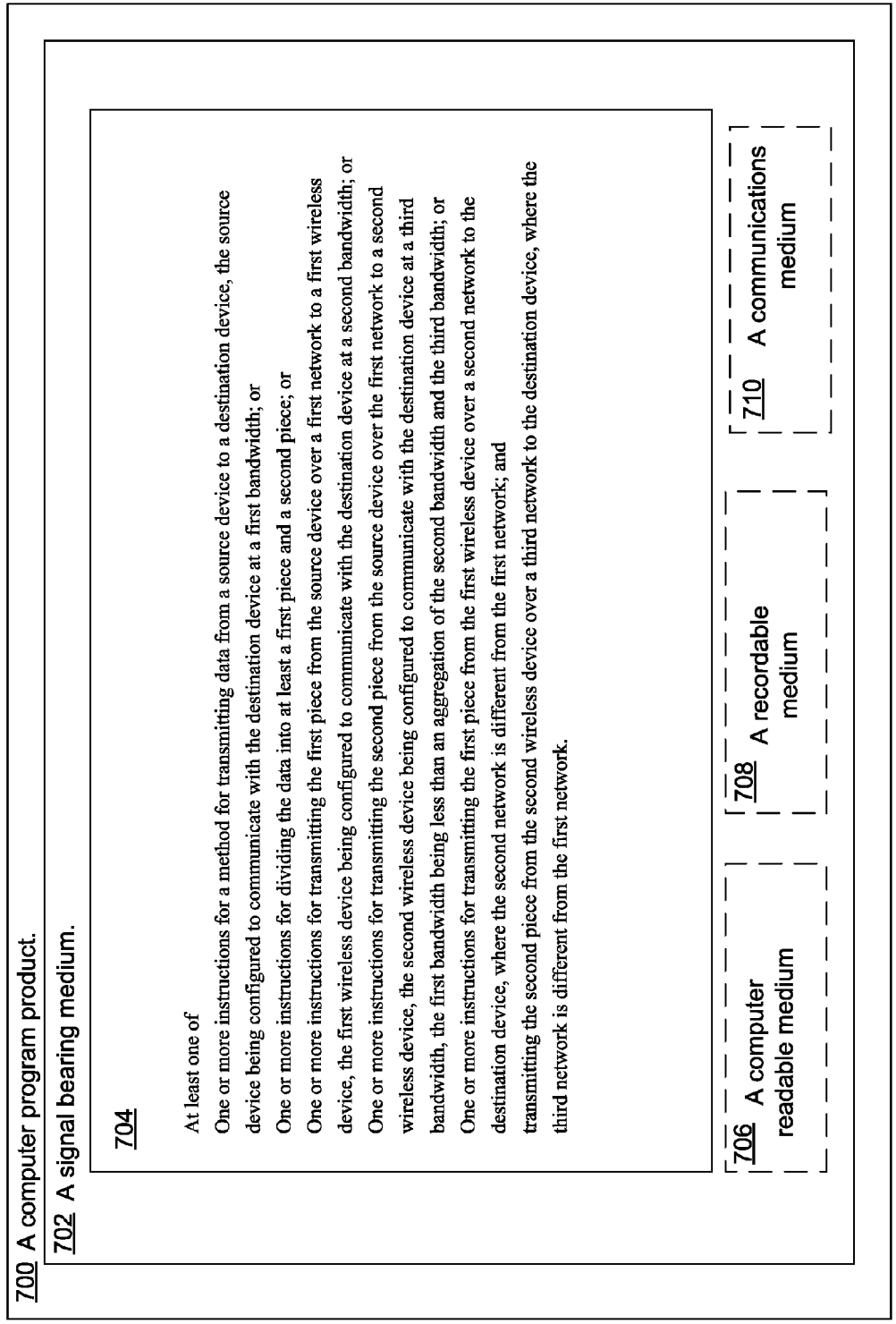
FIG. 7 illustrates computer program products effective to implement aggregation of bandwidth from multiple wireless devices.

FIG. 7 illustrates computer program products 700 effective to implement aggregation of bandwidth from multiple wireless devices, arranged in accordance with at least some embodiments presented herein. Program product 700 may include a signal bearing medium 702. Signal bearing medium 702 may include one or more instructions 704 that, when executed by, for example, a processor, may provide the functionality described above with respect to FIGS. 1-6. Thus, for example, referring to systems 100, 200, 300 or 400, processor 150 may undertake one or more of the blocks shown in FIG. 7 in response to instructions 704 conveyed to the systems 100, 200, 300 or 400 by medium 702.

In some implementations, signal bearing medium 702 may encompass a computer-readable medium 706, such as, but not limited to, a hard disk drive, a Compact Disc (CD), a Digital Video Disk (DVD), a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, program product 700 may be conveyed to one or more modules of the systems 100, 200, 300, or 400 by an RF signal bearing medium 702, where the signal bearing medium 702 is conveyed by a wireless communications medium 710 (e.g., a wireless communications medium conforming with the IEEE 802.11 standard).

FIG. 8 is a block diagram illustrating an example computing device 800 that is arranged to implement aggregation of bandwidth from multiple wireless devices, arranged in accordance with at least some embodiments presented herein. In a very basic configuration 802, computing device 800 typically includes one or more processors 804 and a system memory 806. A memory bus 808 may be used for communicating between processor 804 and system memory 806.

Depending on the desired configuration, processor 804 may be of any type including but not limited to a microprocessor (μP), a microcontroller (μC), a digital signal processor (DSP), or any combination thereof. Processor 804 may include one more levels of caching, such as a level one cache 810 and a level two cache 812, a processor core 814, and registers 816. An example processor core 814 may include an arithmetic logic unit (ALU), a floating point unit (FPU), a digital signal processing core (DSP Core), or any combination thereof. An example memory controller 818 may also be used with processor 804, or in some implementations memory controller 818 may be an internal part of processor 804.

Depending on the desired configuration, system memory 806 may be of any type including but not limited to volatile memory (such as RAM), non-volatile memory (such as ROM, flash memory, etc.) or any combination thereof. System memory 806 may include an operating system 820, one or more applications 822, and program data 824.

Application 822 may include an aggregation of bandwidth from multiple wireless devices algorithm 826 that is arranged to perform the functions as described herein including those described previously with respect to FIGS. 1-7. Program data 824 may include aggregation of bandwidth from multiple wireless devices data 828 that may be useful to implement aggregation of bandwidth from multiple wireless devices as is described herein. In some embodiments, application 822 may be arranged to operate with program data 824 on operating system 820 such that an aggregation of bandwidth from multiple wireless devices may be provided. This described basic configuration 802 is illustrated in FIG. 8 by those components within the inner dashed line.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 806, removable storage devices 836 and non-removable storage devices 838 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 846) to basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to transmit data from a source device to a destination device, the source device being configured to communicate with the destination device at a first bandwidth, the method comprising by the source device:

dividing the data into at least a first piece and a second piece;

transmitting the first piece from the source device over a first network to a first wireless device, the first wireless device being configured to communicate with the destination device over a second network, different from the first network, at a second bandwidth;

transmitting the second piece from the source device over the first network to a second wireless device, different from the first wireless device, the second wireless device being configured to communicate with the destination device over a third network, different from the first network, at a third bandwidth, the first bandwidth being less than an aggregation of the second bandwidth and the third bandwidth, the first bandwidth having insufficient capacity to transmit the data to the destination device;

transmitting the first piece from the first wireless device over the second network to the destination device; and transmitting the second piece from the second wireless device over the third network to the destination device.

2. The method of claim 1, wherein the second network is the same as the third network.

3. The method of claim 1, wherein the second network is different from the third network.

4. The method of claim 1, further comprising receiving the data from at least two input devices different from the source device.

5. The method of claim 1, further comprising:
sending, by the source device, a request for bandwidth over the first network;
receiving a first acknowledgment from the first wireless device in response to the request; and
receiving a second acknowledgment from the second wireless device in response to the request.

6. The method of claim 5, wherein:
the first acknowledgement from the first wireless device includes an indication of a first bandwidth capacity of the first wireless device; and
the second acknowledgement from the second wireless device includes an indication of a second bandwidth capacity of the second wireless device.

7. The method of claim 1, further comprising:
receiving a first indication of a first bandwidth capacity from the first wireless device;
receiving a second indication of a second bandwidth capacity from the second wireless device; and
dividing the data into the first piece and the second piece based on the first bandwidth capacity and the second bandwidth capacity.

8. The method of claim 1, further comprising assigning synchronization data to the first piece and the second piece to facilitate reconstruction of the data from the first piece, the second piece and the synchronization data.

9. A system configured to transmit data from a source device to a destination device, the source device being configured to communicate with the destination device at a first bandwidth, the system comprising:
a first wireless device;
a second wireless device; and
the source device configured to be in communication with the first and second wireless device over a first network;
the source device configured to
divide the data into at least a first piece and a second piece;
transmit the first piece from the source device over the first network to the first wireless device, the first wireless device being configured to communicate with the destination device over a second network, different from the first network, at a second bandwidth;
transmit the second piece from the source device over the first network to the second wireless device, different from the first wireless device, the second wireless device being configured to communicate with the destination device over a third network, different from the first network, at a third bandwidth, and the first bandwidth is less than an aggregation of the second bandwidth and the third bandwidth, the first bandwidth having insufficient capacity to transmit the data to the destination device;
the first wireless device configured to:
receive the first piece;
transmit the first piece from the first wireless device over the second network to the destination device;
the second wireless device configured to:
receive the second piece; and
transmit the second piece from the second wireless device over the third network to the destination device.

10. The system of claim 9, wherein the destination device is configured to:
receive the first and second pieces; and
reconstruct the data based on the first and the second pieces.

11. The system of claim 9, wherein the second network is the same as the third network.

12. The system of claim 9, wherein the second network is different from the third network.

13. The system of claim 9, wherein the source device is further configured to receive the data from at least two input devices different from the source device.

14. The system of claim 9, wherein the source device is further configured to:
send a request for bandwidth over the first network;
receive a first acknowledgment from the first wireless device in response to the request; and
receive a second acknowledgment from the second wireless device in response to the request.

15. The system of claim 14, wherein:
the first acknowledgement from the first wireless device includes an indication of a first bandwidth capacity of the first wireless device; and
the second acknowledgement from the second wireless device includes an indication of a second bandwidth capacity of the second wireless device.

16. The system of claim 9, wherein the source device is further configured to:
receive a first indication of a first bandwidth capacity from the first wireless device;
receive a second indication of a second bandwidth capacity from the second wireless device; and
divide the data into the first piece and the second piece based on the first bandwidth capacity and the second bandwidth capacity.

17. The system of claim 9, wherein the source device is further configured to assign synchronization data to the first piece and the second piece to facilitate reconstruction of the data from the first piece, the second piece and the synchronization data.

18. A method to transmit data from a source device to a destination device, the source device being configured to communicate with the destination device at a first bandwidth having insufficient capacity to transmit the data to the destination device, the method comprising by the source device:
dividing the data into at least a first piece and a second piece;
transmitting the first piece from the source device over a first network to a first wireless device, the first wireless device being configured to communicate with the destination device over a third network, different from the first network, at a second bandwidth;
transmitting the second piece from the source device over a second network to a second wireless device, different from the first wireless device, the second wireless device being configured to communicate with the destination device over the third network, at a third bandwidth, the first bandwidth being less than an aggregation of the second bandwidth and the third bandwidth;
transmitting the first piece from the first wireless device over the third network to the destination device; and transmitting the second piece from the second wireless device over the third network to the destination device.

19. The method of claim 18, further comprising:
receiving by the destination device, the first and second pieces; and
reconstructing, by the destination device, the data based on the first and the second pieces.

20. The method of claim 19, further comprising transmitting, by the destination device, the data to the first wireless device.

* * * * *

UNITED STATES PATENT AND TRADEMARK OFFICE
CERTIFICATE OF CORRECTION

| | |
|---|---|
| PATENT NO. | : 9,232,563 B2 |
| APPLICATION NO. | : 14/118649 |
| DATED | : January 5, 2016 |
| INVENTOR(S) | : Margalit et al. |

It is certified that error appears in the above-identified patent and that said Letters Patent is hereby corrected as shown below:

On the Title Page, in Item (71), under "Applicant", in Column 1, Lines 1-2, delete "EMPIRE TECHNOLOGY DEVELOPMENT, LLC," and insert -- EMPIRE TECHNOLOGY DEVELOPMENT LLC, --, therefor.

On the Title Page, in Item (73), under "Assignee", in Column 1, Lines 1-2, delete "Empire Technologies Development LLC," and insert -- Empire Technology Development LLC, --, therefor.

IN THE SPECIFICATION

In Column 1, Line 8, delete "§371" and insert -- § 371 --, therefor.

Signed and Sealed this
Nineteenth Day of April, 2016

Michelle K. Lee
*Director of the United States Patent and Trademark Office*